(12) United States Patent
Defilippi et al.

(10) Patent No.: US 12,407,612 B2
(45) Date of Patent: Sep. 2, 2025

(54) PROGRAMMABLE PATH COMPUTATION ENGINE

(71) Applicant: Ciena Corporation, Hanover, MD (US)

(72) Inventors: Todd Defilippi, Redwood City, CA (US); Cengiz Alaettinoglu, Sherman Oaks, CA (US); Parag Amritkar, Pune (IN); Peeyush Deshpande, Pune (IN)

(73) Assignee: Ciena Corporation, Hanover, MD (US)

( * ) Notice: Subject to any disclaimer, the term of this patent is extended or adjusted under 35 U.S.C. 154(b) by 34 days.

(21) Appl. No.: 18/355,836

(22) Filed: Jul. 20, 2023

(65) Prior Publication Data

US 2024/0406110 A1    Dec. 5, 2024

(30) Foreign Application Priority Data

May 30, 2023    (IN) .............................. 202311037219

(51) Int. Cl.
*H04L 47/76*    (2022.01)
*H04L 47/125*   (2022.01)

(52) U.S. Cl.
CPC ............ *H04L 47/125* (2013.01); *H04L 47/76* (2013.01)

(58) Field of Classification Search
CPC .............................. H04L 47/125; H04L 47/76
USPC ........................................................ 709/224
See application file for complete search history.

(56) References Cited

U.S. PATENT DOCUMENTS

| | | |
|---|---|---|
| 7,120,792 B1 | 10/2006 | Jacobson et al. |
| 7,197,573 B1 | 3/2007 | Jacobson et al. |
| 7,539,191 B1 | 5/2009 | Jacobson et al. |
| 8,135,834 B1 | 3/2012 | Jacobson et al. |
| 8,274,901 B1 | 9/2012 | Casner et al. |
| 8,422,502 B1 | 4/2013 | Alaettinoglu et al. |
| 8,743,768 B2 * | 6/2014 | Vasseur ................... H04L 45/26 370/312 |
| 8,937,946 B1 | 1/2015 | Kanna et al. |
| 9,026,674 B1 * | 5/2015 | Kanna ................... H04L 43/062 709/239 |
| 10,567,293 B1 * | 2/2020 | Pularikkal ............... H04L 69/22 |
| 11,057,278 B1 | 7/2021 | Côté et al. |
| 12,120,018 B2 * | 10/2024 | Hu .......... H04L 45/22 |
| 2014/0369238 A1 * | 12/2014 | Alaettinoglu ........... H04L 45/02 370/255 |
| 2016/0028834 A1 * | 1/2016 | Agrawal ............... H04L 43/087 709/224 |

(Continued)

FOREIGN PATENT DOCUMENTS

WO    2023038818 A1    3/2023

*Primary Examiner* — Karen C Tang (74) *Attorney, Agent, or Firm* — Baratta Law PLLC; Lawrence A. Baratta, Jr.

(57) ABSTRACT

Systems and methods for computing paths through a network are provided. A method, according to one implementation, includes the step of storing and managing a first set of objects including one or more Segment Routing (SR) policies and Traffic Engineering (TE) tunnels, where the first set of objects represents custom behavior received from a network operator for defining intended characteristics of traffic flowing through a network. The method also includes the step of storing and managing a second set of objects representing one or more managed paths through the network, where the managed paths are calculated by a TE technique using the one or more SR policies and TE tunnels.

20 Claims, 5 Drawing Sheets

(56) References Cited

U.S. PATENT DOCUMENTS

| | | | |
|---|---|---|---|
| 2016/0057049 A1* | 2/2016 | Jacobson | H04L 45/123 370/392 |
| 2016/0191349 A1* | 6/2016 | Buege | H04L 41/5067 709/224 |
| 2016/0218964 A1* | 7/2016 | Liljenstolpe | H04L 45/56 |
| 2017/0064717 A1* | 3/2017 | Filsfils | H04L 45/50 |
| 2018/0048525 A1* | 2/2018 | Karasaridis | H04L 69/40 |
| 2021/0099378 A1 | 4/2021 | Alaettinoglu et al. | |
| 2022/0086078 A1 | 3/2022 | Sivabalan et al. | |
| 2023/0021278 A1* | 1/2023 | Filsfils | H04L 45/566 |
| 2023/0067946 A1 | 3/2023 | Alaettinoglu et al. | |
| 2023/0095297 A1 | 3/2023 | Alaettinoglu et al. | |
| 2023/0098528 A1 | 3/2023 | Alaettinoglu et al. | |
| 2023/0146226 A1 | 5/2023 | Sivabalan et al. | |

\* cited by examiner

PROGRAMMABLE PATH COMPUTATION ENGINE

TECHNICAL FIELD

The present disclosure generally relates to networking systems and methods. More particularly, the present disclosure relates to systems and methods for computing paths based on user input.

BACKGROUND

Generally, Internet Protocol (IP) routing involves technologies, methodologies, and protocols for steering data packets through a network. IP routing includes determining a suitable path from a source node to a destination node within the network. However, since IP routing will cause all flows to overuse certain low metric links and does not give flow-by-flow ways to control the path, Service Providers (SPs) may often wish to use Traffic Engineering (TE) techniques to determine paths for forwarding traffic (e.g., messages, signals, data, etc.) through their networks. When traffic is forwarded by TE paths, rather than normal IP routing, the SPs are able to track the routes that the data or signals take through the network. Also, the SPs can monitor the utilization or consumption of bandwidth resources that correspond to the traffic flows. By monitoring resource usage, the SPs can ensure that network bandwidth and associated resources are not over-utilized. Furthermore, compared with single-metric IP routing, TE paths give the SPs greater control over which paths these traffic flows will take.

BRIEF SUMMARY

The present disclosure is directed to systems and methods for computing paths through a network. A process, according to one implementation, includes the step of storing and managing a first set of objects that includes one or more SR policies and TE tunnels. The first set of objects, for example, represents custom behavior received from a network operator for defining intended characteristics of traffic flowing through a network. The process further includes the step of storing and managing a second set of objects, which represent one or more managed paths through the network. The managed paths, for example, are calculated by a TE technique using the one or more SR policies and TE tunnels.

According to some embodiments, the process may further include the step of instantiating the one or more managed paths in the network to enable the traffic to flow from a source node to a destination node through one of the one or more managed paths. Also, the process may be configured to manage the first set of objects and the second set of objects separately. Furthermore, the process may include the step of utilizing bandwidth requests in the first set of objects to reserve bandwidth resources in the network. Also, the process may include a) allowing the one or more managed paths to be added or removed from a Path Computation Engine (PCE) when managed Candidate Paths (CPs) and Label Switched Paths (LSPs) are added or removed, and b) automatically modifying the second set of objects using path calculation procedures and rule-based engines.

In some embodiments, the process may include the steps of collecting bandwidth capacity of interfaces in the network and tracking bandwidth of the TE tunnels and SR policies based on the collected bandwidth capacity. The process may determine protocols and events in the network and then calculate the managed paths based on the protocols and events. Also, the process may be configured to track and monitor the one or more managed paths. The process can also implement one or more customizable rules on any of the first and second sets of objects, where the one or more customizable rules may be based on the custom behavior received from the network operator.

Furthermore, in some embodiments, each of the TE tunnels and SR policies may include constraints, which may include a) link affinities, b) shared risk link groups, c) resource diversity from other TE paths, and/or d) explicit inclusions or exclusions of specific nodes and interfaces. In some embodiments, a database may be used for storing the first and second sets of objects. Also, the process may include managing the first and second sets of objects via a database management system. The process may include another step of converting the custom behavior into one or more customized rules. The SR policies may include a primary candidate path and one or more standby candidate paths. The TE tunnels may include a primary LSP and one or more standby LSPs. The TE tunnels may be set up and routed via RSVP or SR techniques.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for computing paths through a communications network. The systems and methods include receiving input from a network operator and using this input to create paths that can be managed. In addition, the present disclosure describes systems and methods for storing, monitoring, and managing different sets of data objects. A first set of data objects may be related to input from the network operator and may be referred to as Traffic Engineering (TE) paths. The first set of objects defines an intent of the network operator with respect to intended characteristics of the data traffic flowing through the network. The TE paths may include Segment Routing (SR) policies, TE tunnels, candidate paths, Label Switched Paths (LSPs), etc. A second set of data objects may be related to "managed paths," which include paths or routes calculated or derived from the user-entered TE paths. The managed paths in the second set of objects can be stored and managed separately from the first set of data objects related to the user input.

Managing a collection of SR policies and TE tunnels in a network can be done with network management systems that track the TE paths. Path computation of the TE paths in the network can be done via Constrained Shortest Path First (CSPF) algorithm if the system has knowledge of Layer 3 networking protocols and network resources. Most vendors with a Path Computation Engine (PCE) may have some combination of inventory functionality and path computation functionality.

To satisfy various demands or requests from different Service Providers (SPs), some solutions can make use of professional services and implement custom demands or requests at a low level of the code, resulting in different customized deployments essentially being different products altogether. Since such solutions would require additional time and resources, both from the vendor and the customer, to implement these solutions, it would be beneficial, according to the systems and methods of the present disclosure, to provide a programmable PCE that can satisfy different customers. Thus, the present disclosure is configured to offer a single programmable solution that can be customized for any network having any scale based on needs of the network, as can be defined by the network operator or administrator. This allows one solution to be scaled across an increasing number of customer demands/needs and network equipment deployments.

Figure 1:
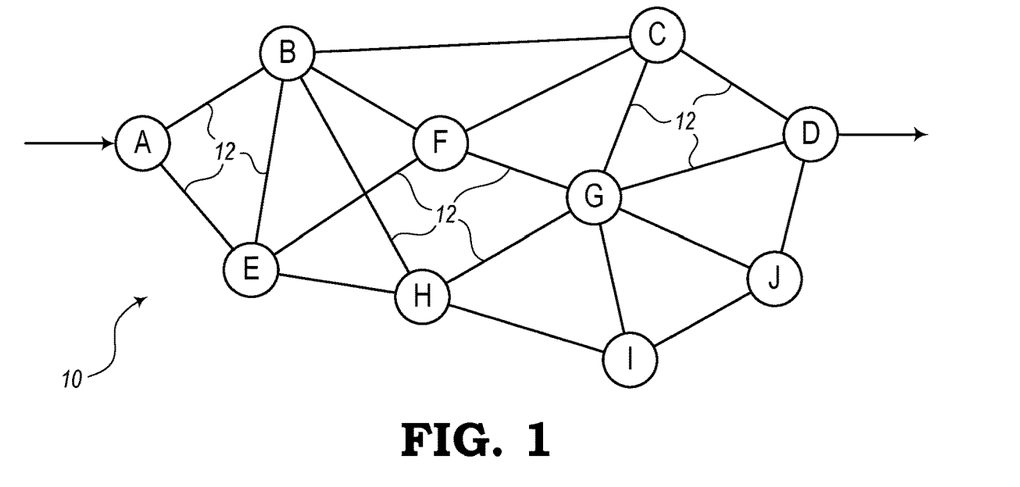
FIG. 1 is a diagram illustrating an example of a network or autonomous system through which paths can be computed according to a programmable methodology.

FIG. 1 is a diagram illustrating an example of a network 10 or autonomous system through which paths or routes can be programmably computed. The network 10, for example, may be associated with a portion of a Service Provider (SP) network or system. In this example, the network 10 includes nodes labeled A-J, where Node A is an ingress node and Node D is an egress node. It should be noted that multiple paths may be defined between Nodes A and D using various links 12. Thus, network traffic (e.g., data, signals, etc.) may be transmitted from Node A to Node D (or vice versa) using any suitable path.

The SP may wish to make use of TE paths to forward traffic throughout the network 10. When traffic is forwarded by TE paths, as opposed to normal Internet Protocol (IP) routing, the SP is able to track the route that the data takes through the network 10. The PCE models the bandwidth used based on these specifications on each link, and makes sure bandwidth is not over committed (though an oversubscription factor is allowed). This allows the SP to monitor the status of the bandwidth resources to ensure that they are not over-consumed, which can lead to congestion for other customers. Also, the SP can monitor network bandwidth, which may be related to one or more of the Nodes A-J to ensure that they are not over-utilized as well. TE paths also give the SP greater control over which paths these flows take when compared to single-metric IP routing. For example, the SP may be able to control certain constraints within the network 10, such as link affinities, shared risk link groups, resource diversity from other TE paths, the explicit inclusion or exclusion of specific nodes and interfaces in the resulting path, among other characteristics.

Figure 2:
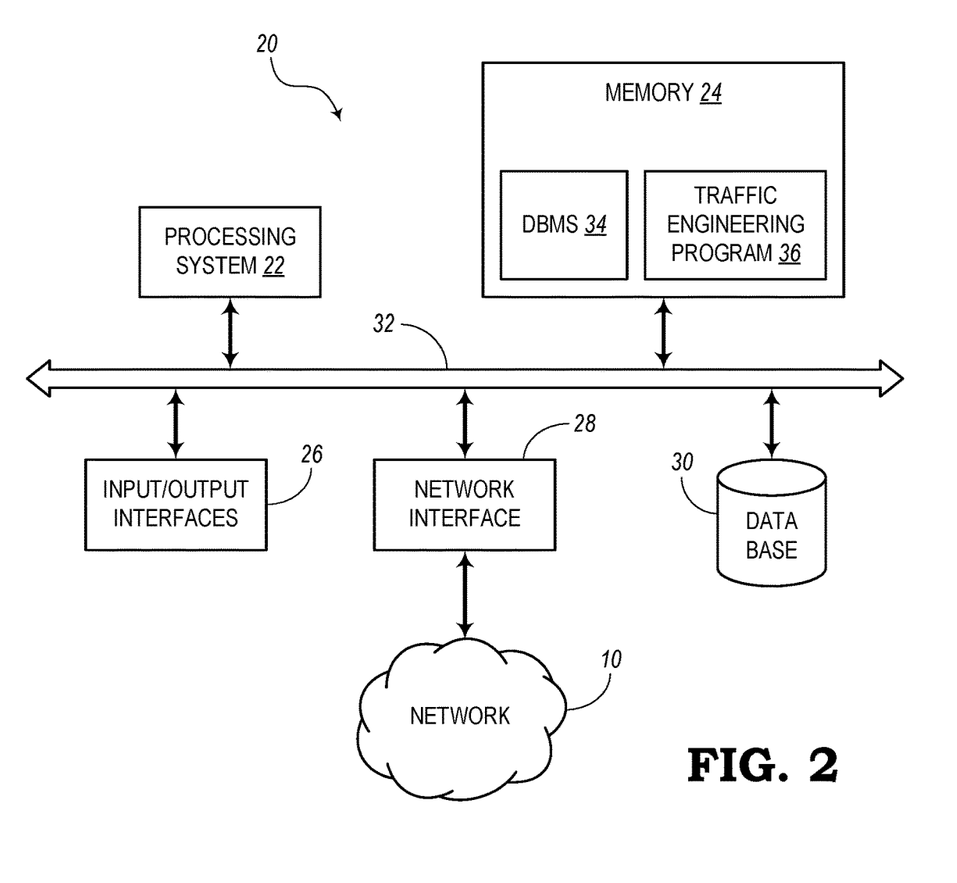
FIG. 2 is a block diagram illustrating an embodiment of a Path Computation Engine (PCE).

To this end, the SP may want to use a Path Computation Engine (PCE) to manage and calculate paths for these TE paths. For example, one such PCE is shown in FIG. 2. In contrast to many conventional PCEs, the embodiments of PCEs described in the present disclosure are configured to be programmable and may allow a network operator to easily enter certain intentions for how traffic is routed.

By providing a programmable PCE, as described in the present disclosure, different SPs may wish to request or demand certain network behavior with respect to TE paths. Some SPs may wish to program a simple set of TE paths to help optimize traffic in a relatively static network. In this case, the PCE is configured to make sure that the TE paths stay on their intended paths under various network failures and repairs. Other SPs may wish to program a more reactive set of TE paths in a closed-loop solution. In this case, the TE paths can be created, modified, and removed based on various network events in conjunction with custom SP settings.

Therefore, instead of creating different PCE products for handling each of a number of specific needs based on the demands of a network operator or administrator, the embodiments of the present disclosure provide a programmable PCE that can handle various different user demands and various network behaviors and architectures. By providing this programmability feature, there is no longer a need to expend large amounts of time and resources from engineering and professional services to specifically suit a particular network. Rather, the embodiments of the present disclosure are created so as to allow for a variety of different behaviors and actions to be added by the SP, network operator, or customer as needed.

One way that the present disclosure is able to manage the programmability is by treating the TE paths as resources that can be monitored and modified. For example, the monitoring and modifying of network resources may involve Create/Read/Update/Delete (CRUD) operations. This gives the SP a better understanding of a) what TE paths are present, b) what those TE paths are currently doing in the network, and c) how the TE paths can be added to or removed from the network. Breaking these actions down into simple CRUD operations makes it easier for the SP to understand the individual impact of each such action, thus also making it easier to understand how such actions can be combined. Another way is to make use of rule-based engines to monitor changes to the TE paths and determine when further actions are needed. Thus, different SP demands may be broken down into smaller actions that can be implemented as custom rules within the same product framework, rather than requiring customized path computation products.

Path Computation Engine (PCE)

FIG. 2 is a block diagram illustrating an embodiment of a Path Computation Engine (PCE) 20, which may be used for monitoring and controlling aspects of traffic routes through the network 10. In the illustrated embodiment, the PCE 20 may be a digital computing device that generally includes a processing system 22 (e.g., processor(s), processing units, processing system, etc.), a memory 24 (e.g., memory), Input/Output (I/O) interfaces 26, a network interface 28, and a database 30. It should be appreciated that FIG. 2 depicts the PCE 20 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

The PCE 20 may be configured to manage a set of managed policies and managed tunnels that correspond to SR policies and TE tunnels desired in the network 10. The PCE 20 may be in charge of simple CRUD operations on these managed policies and managed tunnels via a northbound REST API, which may be associated with the I/O interfaces 26 and/or network interface 28. The PCE 20 can use its knowledge of network protocols and events to calculate paths for these managed policies and managed tunnels, and to ensure they react to network changes that may affect them. The PCE 20 may be configured to track the bandwidth requested by the managed policies and managed tunnels to ensure bandwidth resources are not over-utilized. The PCE 20 may also manage a set of rule-based engines to act upon these managed policies and managed tunnels to allow for customizable behavior for different SP deployments.

As shown in FIG. 2, the PCE 20 may also include a Database Management System (DBMS) 34 for managing information regarding TE paths in the network 10. The PCE 20 may also include a Traffic Engineering (TE) program 36. The DBMS 34 and TE program 36 may be implemented in any suitable combination of hardware, software, and/or firmware in the PCE 20. As illustrated, the DBMS 34 and TE program 36 may be configured as software or firmware and stored in any suitable non-transitory computer-readable media (e.g., memory 24) that includes computer logic, instructions, commands, code, etc. for enabling the processing system 22 to perform certain TE functions and store TE paths in the database 30.

Figure 3:
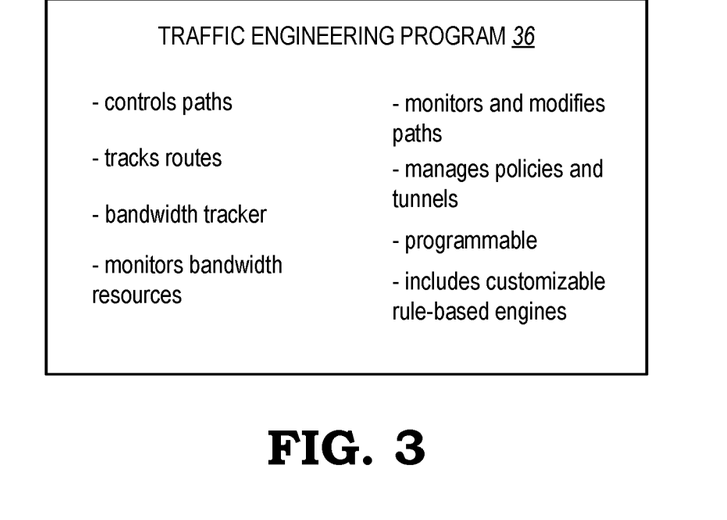
FIG. 3 is a block diagram illustrating an embodiment of a Traffic Engineering (TE) program for controlling the computation of paths through a network.

FIG. 3 is a block diagram illustrating an embodiment of the TE program 36 for controlling the computation of paths through a network (e.g., network 10). The TE program 36 may be configured to control and/or track paths, routes, bandwidth, bandwidth resources, etc. In addition, the TE program 36 may include monitoring functionality and can be configured to perform automatic modifications to the TE paths accordingly. The TE program 36 can also manage policies and tunnels.

Also, the TE program 36 may be programmable to allow a user (e.g., network operator, administrator, etc.) to enter certain intentions for how the network 10 is to be used, where the TE program 36 can then use this user-entered input to compute paths that can further be managed during use of the network. The TE program 36 may include customizable rule-based engines.

In the present disclosure, the term "TE paths" may refer to both TE tunnels and Segment Routing (SR) policies. TE tunnels may include multiple Label-Switched Paths (LSPs), one of which may be a primary LSP and one or more of which may be secondary or standby LSPs. The SR policies may include multiple Candidate Paths (CPs), one of which may be a primary CP and one or more of which may be secondary or standby CPs. The TE tunnels can be set up and routed via RSVP or SR, while the SR policies are exclusively segment-routed. In both cases, the primary path is usually the actively used path when it is valid (e.g., free of faults, available, operational, etc.). The secondary and standby paths may be used for protection when the primary path is not valid (e.g., faulty, unavailable, non-operational, congested, infeasible, etc.).

Figure 4:
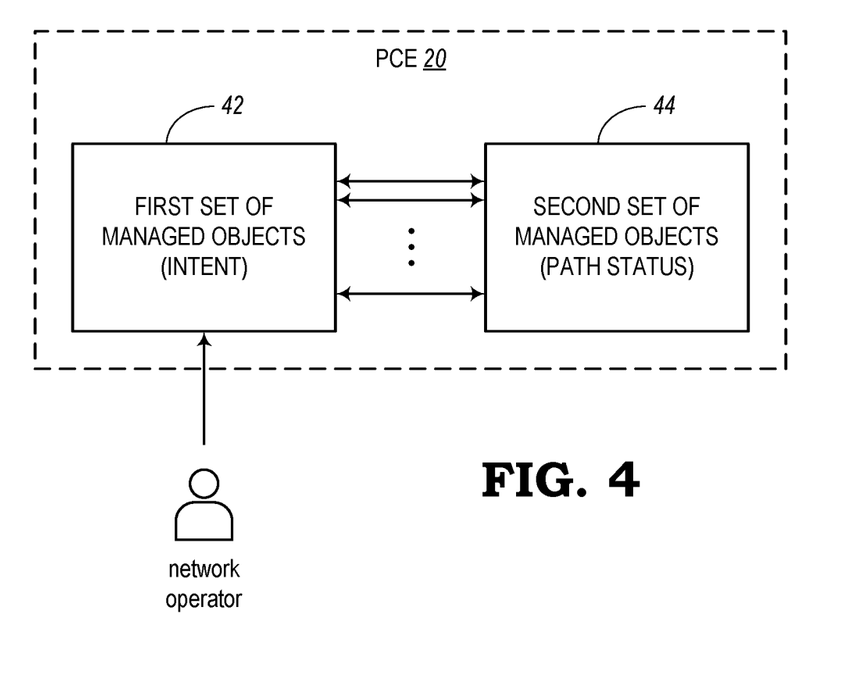
FIG. 4 is a block diagram illustrating a high-level interaction between two sets of managed objects.

FIG. 4 is a block diagram illustrating a high-level interaction between two sets of managed objects in the PCE 20. The managed objects may be data objects stored in the database 30 of the PCE 20 and may be managed by the DBMS 34. The managed objects may include a first set of managed objects 42, which may represent the intent of a network operator, according to inputs from the network operator. The managed objects may further include a second set of managed objects 44, which may represent the status of the TE paths stored in the database 30. The managed objects may be monitored and modified by the TE program 36 as needed to maintain valid paths through a network. The DBMS 34 may be configured to provide interactions between the first and second sets of managed objects 42, 44, whereby changes in the user input can be used to update managed paths in the network and changes in the status of the network can be communicated to the corresponding CPs and LSPs in the first set of managed objects 42.

Managed Objects

Figure 5:
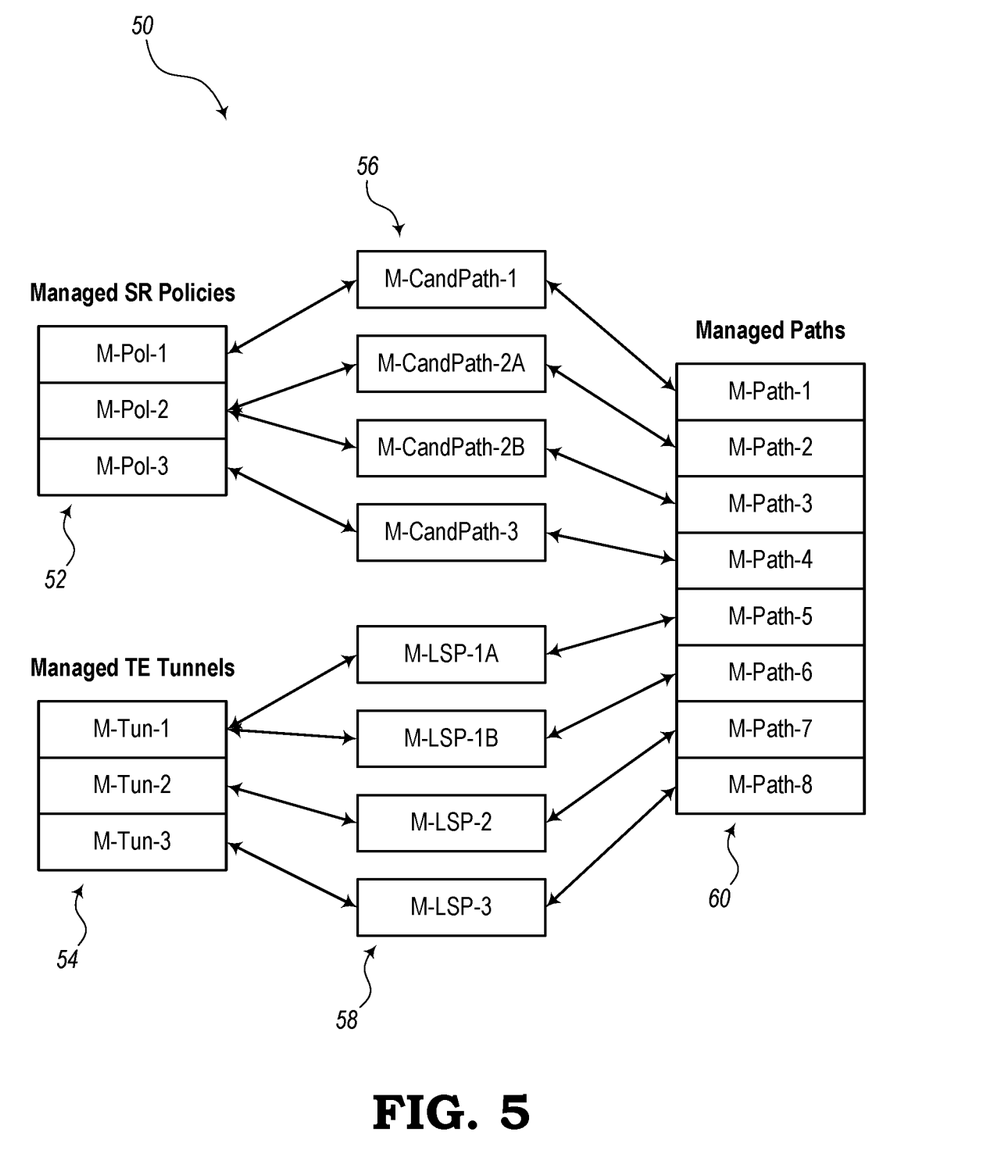
FIG. 5 is a diagram illustrating an embodiment of a memory structure for storing sets of managed objects related to path computation techniques.

FIG. 5 is a diagram illustrating an embodiment of a memory structure 50 for storing sets of managed objects related to path computation techniques. The memory structure 50 may be stored in the database 30 and may be managed by the DBMS 34 according to the functionality of the TE program 36. As shown, the memory structure 50 includes managed SR policies 52 and managed TE tunnels 54, which may be directly or indirectly entered by a user (e.g., network operator, administrator, etc.). In this example, the managed SR policies 52 are labelled M-Pol-1, M-Pol-2, and M-Pol-3 and the managed TE tunnels 54 are labelled M-Tun-1, M-Tun-2, and M-Tun-3.

The TE program 36 may be configured to derive managed Candidate Paths (CPs) 56 from the manage SR policies 52. As shown, the managed CPs 56 are labelled M-CandPath-1, M-CandPath-2A, M-CandPath-2B, and M-CandPath-3. Also, the TE program 36 may be configured to derive managed LSPs 58 from the managed TE tunnels 54. As shown, the managed LSPs 58 are labelled M-LSP-1A, M-LSP-1B, M-LSP-2, and M-LSP-3. The managed SR policies 52, managed TE tunnels 54, managed CPs 56, and managed LSPs 58 may be associated with the first set of managed objects 42 shown in FIG. 4. From the managed CPs 56 and managed LSPs 58, the TE program 36 may be configured to derive managed paths 60, which may be configured as the second set of managed objects 44 shown in FIG. 4. As illustrated, the managed paths 60 may include M-Path-1 through M-Path-8.

As mentioned above, the managed SR policies 52 may include managed candidate paths 56 and the managed TE tunnels 54 may include managed LSPs 58. Additionally, the path information for each managed candidate path 56 and managed LSP 58 will be broken out into a managed path 60. By doing this, the TE program 36 is able to separate the intent pieces (e.g., first set of managed objects 42) from the path pieces (e.g., second set of managed objects 44).

The first set of managed objects 42 contains information representing what the user intends for the managed policy and managed tunnel to do. This may include specific constraints, such as bandwidth required, affinity, diversity, inclusions, exclusions, etc., which may be used in a CSPF calculation. The second set of managed objects 44 contains information representing the results of those TE calculations by the TE program 36. The user can directly modify the first set of managed objects 42 through CRUD operations on the managed SR policies 52 and managed TE tunnels 54, whereas the second set of managed objects 44 can only be modified internally in the PCE 20 via path calculations and rule-based engines. This may be done indirectly as a result of user actions and network changes. Each managed candidate path 56 and managed LSP 58 within a managed policy or managed tunnel will have its own managed path 60 that it points to in order to store its path results.

The separation of the first and second sets of managed objects 42, 44 allows the structure of path information in the managed paths to be considered separately from the structure of intent information in the managed policies and managed tunnels. At its simplest, each managed path 60 could just be a list of interfaces in the path. However, it is also possible the information in the managed paths could get richer and more complicated as more functionality is added to the PCE 20.

Figure 6A:
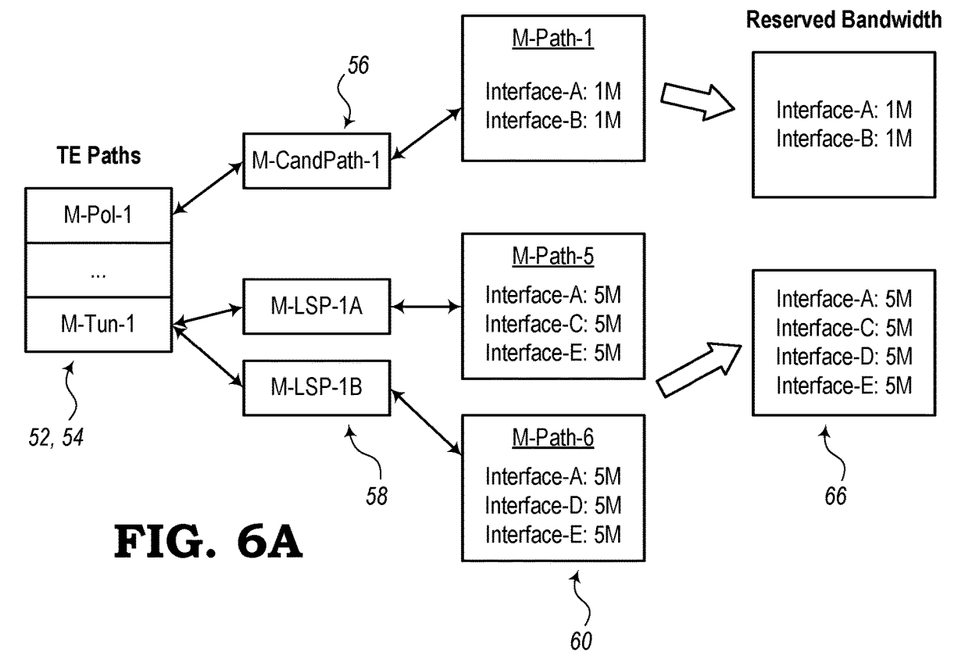
FIGS. 6A and 6B are diagrams illustrating an example of a bandwidth tracking methodology.
Figure 6B:
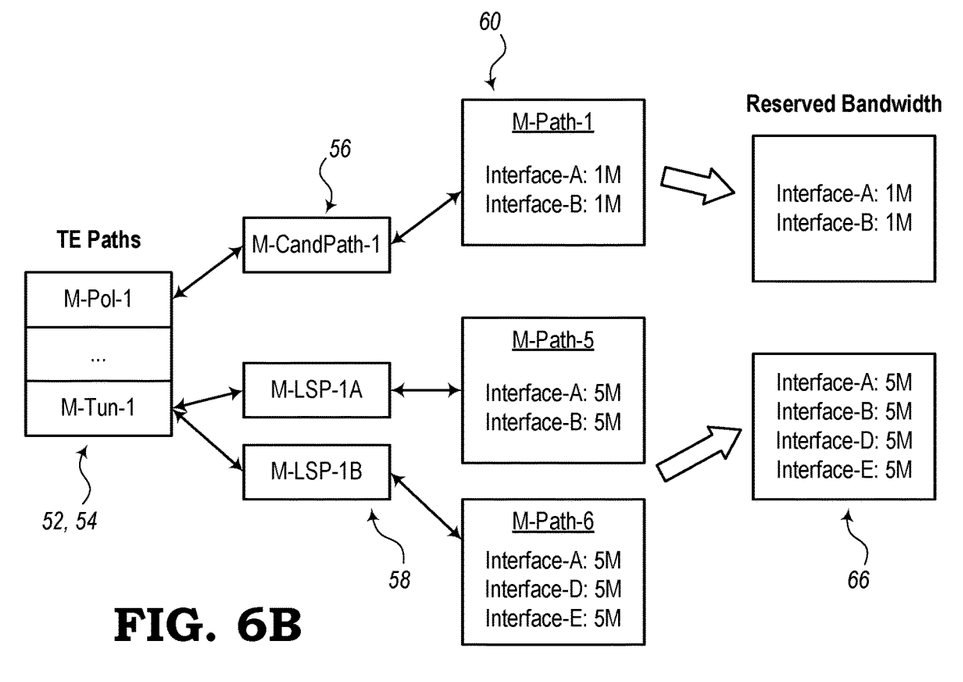

FIGS. 6A and 6B are diagrams illustrating an example of a bandwidth tracking methodology. This may include any suitable method for handling bandwidth reservations with segment routing and centralized PCE under real-time topology changes. In that framework, the path itself may include multiple different versions of the path, which allows the TE program 36 to track differences in a) the most recently calculated path, b) the mostly recently approved path, and c) the most recently provisioned path. Tracking these different versions of the path provides more flexibility with how bandwidth can be reserved in the network and how the TE program 36 may react to routing events, which might affect the feasibility of certain paths for a given TE path. By separating the managed path 60 out from the managed candidate path 56 and managed LSP 58, the TE program 36 may allow whatever path considerations, which the PCE 20 may account for in the managed paths, to develop separately from whatever intent considerations to account for in the managed SR policies 52 and managed TE tunnels 54. As far as the managed policies and managed tunnels are concerned, the managed paths 60 may be considered to be an opaque box containing path information.

The reserved bandwidth 66 shown in FIG. 6A includes interfaces A and B using 1M with respect to the managed path M-Path-1. Interfaces A, C, D, and E use 5M on managed paths M-Path-5 and M-Path-6. Then, with changes to M-Path-5 to use interfaces A and B, the reserved bandwidth 66 shown in FIG. 6B includes the use of interfaces A, B, D, and E using 5M each. Thus, the bandwidth can be tracked to determine what resources might be reserved.

Internally, the PCE 20 may be configured to allow for managed policies, managed tunnels, and managed paths to be added, updated, and removed in simple operations. The modifications on managed policies and tunnels can be exposed in northbound APIs so that they can be modified by users or third-party APIs. The modifications on managed paths 60 can only be done internally in the PCE 20. When any of these managed objects are updated, the PCE 20 also makes sure that the resulting managed objects are properly linked to each other. Specifically, the managed SR policies 52 are linked to managed candidate paths 56, the managed TE tunnels 54 are linked to the managed LSPs 58, and managed paths 60 are linked to the managed candidate paths 56 and managed LSPs 58. The TE program 36 can make sure these linkages are property tracked, as modifications can be done on any of these managed objects. This may be helpful when the TE program 36 performs bandwidth tracking and rule engine processing later on.

Bandwidth Tracking

One job of the PCE 20 may be bandwidth tracking. The PCE 20 may be configured to determine which TE paths are consuming which pieces of bandwidth on which links in the network (e.g., network 10). This computation may be used to make sure no link gets over-utilized. To serve this purpose, the TE program 36, as shown in FIG. 3, may be configured to track bandwidth (e.g., using bandwidth tracker or bandwidth tracking functionality) to track which TE paths are present and which interfaces they are currently consuming bandwidth on. The TE program 36 may separately collect information on the bandwidth capacity of interfaces within the network through collection and monitoring of Interior Gateway Protocol (IGP) routing procedures. By combining these two sources of information, the TE program 36 may be configured to track how much bandwidth is left on interfaces throughout the network after taking existing managed TE paths into account. Then, the TE program 36 can make use of this information for subsequent CSPF path calculations.

In the present embodiments, each managed SR policy may have its managed candidate paths 56 share the same bandwidth and each managed TE tunnel 54 may have its managed LSP paths 58 share the same bandwidth. As such, the presence of multiple managed candidate paths 56 per managed policy or multiple managed LSPs 58 per managed tunnel can be provided for protection, where the purpose of the secondary or backup path is to carry traffic when a primary path is no longer valid. If the primary and secondary path have an interface in common, the TE program 36 may not want to double-reserve on that interface, since both paths are representing the same traffic flow. Additionally, each managed candidate path 56 or managed LSP 58 can make use of the path stored in its attached managed path 60. As a result, each managed policy or managed tunnel ultimately gets the interfaces it is consuming bandwidth on from all of its attached managed paths 60. Each managed policy or managed tunnel will be tracked by a different TE path in the bandwidth tracker.

This means any add/update/remove operation on any of these managed objects can ultimately affect which interfaces a managed policy or managed tunnel reserves bandwidth on. When one or more changes are requested, the PCE 20 may be configured to track the effects via its bandwidth tracker and update which interfaces a TE path needs to reserve on as a result of the changes it is processing for these managed objects. This will also include determining if such changes will result in over-reserving any interfaces, which it should not allow; note, an acceptable oversubscription ratio is often desired, but beyond that over-reserving needs to be disallowed. If these changes result in such over-reserving, the TE program 36 may be configured to cancel out the set of managed object changes currently being processed and make sure the PCE 20 returns to the state of the affected managed objects and bandwidth tracking that were in effect before the TE program 36 started processing the current set of managed object changes.

Rule Processing

There are certain events that the PCE 20 would need to react to regardless of which network (e.g., network 10, SP network, etc.) it is deployed on. For example, when nodes or interfaces go down in the network, the PCE 20 may be configured to determine which managed policies and managed tunnels traverse those elements and recalculate their paths around failures. Reaction to network events like this may normally be a basic requirement for a PCE. Using the PCE 20 of the present disclosure, different customers may also have additional custom behavior they would like implemented on their network.

For example, suppose there are two customers, Customer 1 and Customer 2, whose deployments seem similar at first. Both want policies with two candidate paths, where one is a primary path and one is a secondary path, which are diverse from each other, such that, if the primary path fails, then the secondary path is not affected. In this example, suppose both customers would also like to have a third best-effort IGP-only candidate path in case either the primary or secondary fails, so that there is a third option in case of two failures in the network. Where they differ in this example, however, is that Customer 1 might prefer for this third candidate path to always be present, whereas Customer 2 might prefer for this third candidate path to only be present when necessary (i.e., when either the primary path or secondary path has failed) and is to be removed when not necessary (i.e., when both the primary and secondary paths are valid). It should be noted, therefore, that hard-coding either of these methods to suit one customer would then mean additional hard-coding of the other method in a separate codebase to suit the other customer, which of course can be wasteful in terms of engineering resources.

Therefore, the systems and methods of the present disclosure may be configured to perform the functionality described above through a set of rule-based engines at different scopes: 1) a managed path scope, 2) a managed policy and managed tunnel scope, and 3) a managed policy group and managed tunnel group scope.

Regarding rule-based engines defined on (1) the managed path scope, the present disclosure may include the following. At the smallest scope, each managed path can have its own rule engine. The rules in the managed path rule engine can look at the state of that managed path to check their condition. Those rules can then update that managed path with their actions.

For example, a method for handling bandwidth reservations with segment routing and centralized PCE under real-time topology changes may be used. If this is the case, the path may include different versions of the path such as a) the most recently calculated path, b) the most recently approved path, and c) the most recently provisioned path. There are a number of actions that can occur internally to a given path. Different customers may want to implement different checks and different behaviors (or demands) on when the most recently calculated path becomes the most recently approved path. Some customers may want it to occur instantly regardless of what the most recently calculated path looks like. Others may want it to occur with a delay of five minutes, for example, and only if the most recently calculated path is a better path. This could be done by using different managed path rules based on the needs of different customers.

Regarding rule-based engines defined on (2) the managed policy and managed tunnel scope, the present disclosure may include the following. At the intermediate scope, each managed policy and managed tunnel can have its own rule engine too. The rules in that rule engine can look at the state of that managed policy or managed tunnel to check their condition, but they can also look at the state of the managed paths attached to that managed policy or managed tunnel. Along similar lines, those rules can then update that managed policy or managed tunnel with their actions, but their actions can also update their attached managed paths.

For example, using the Customer 1 and Customer 2 scenario mentioned above, Customer 2 could implement a managed policy rule that would look at the managed policy and the states of its attached managed paths to determine when either of the managed paths was down, and update the managed policy to add a new candidate path if that were the case. Customer 2 could also implement another rule to remove the third candidate path when both the primary and secondary managed paths were up. Customer 1 would not include either such rule. In this way, we are able to implement the behavior Customer 2 wants through customized rules rather than a larger re-working of overall PCE behavior.

Regarding rule-based engines defined on (3) the managed policy group and managed tunnel group scope, the present disclosure may include the following. At the largest scope, the PCE 20 can also define groups of managed policies or managed tunnels and allow them to have their own rule-based engines. The rules in that rule-based engine can look at the states of all of the managed policies or managed tunnels within the group to check their condition, and can additionally look even further into their attached managed paths if so desired. Similarly, those rules can then update any of the managed policies or managed tunnels within the group with their actions and can also update their attached managed paths.

For example, if a set of SR policies were meant to have path diversity from each other, a change to one of the SR policy's paths would affect the other SR policies in the group, so they would need to be recalculated as a group. The resulting changes to bandwidth reservation due to changes in their managed paths could face bandwidth contention issues if one managed path was updated independently of the others, as the others may still lay claim to the bandwidth that it needs. Rather, all such managed path changes would need to be done in a single action to ensure that bandwidth could be successfully reserved over all of the recalculated paths. A managed policy group rule would allow us to update all managed policies and managed paths under the scope of the managed policy group as a single action to ensure it succeeds.

These rules would do checks on the states of the various managed policies, managed tunnels, managed candidate paths, managed LSPs, and managed paths available at their various scopes. They would also perform basic add/update/remove operations on the various managed policies, managed tunnels, managed candidate paths, managed LSPs, and managed paths available at their various scopes too. Combinations of various checks can be done via "and," "or," "any," "all," other various Boolean combinations, and combinations of actions could be done in a similar manner. By combining simple checks and simple actions in this manner, it is possible to create the custom behavior needed for different deployments without requiring custom implementation of such behavior to be written from scratch.

Path Computation Process

Figure 7:
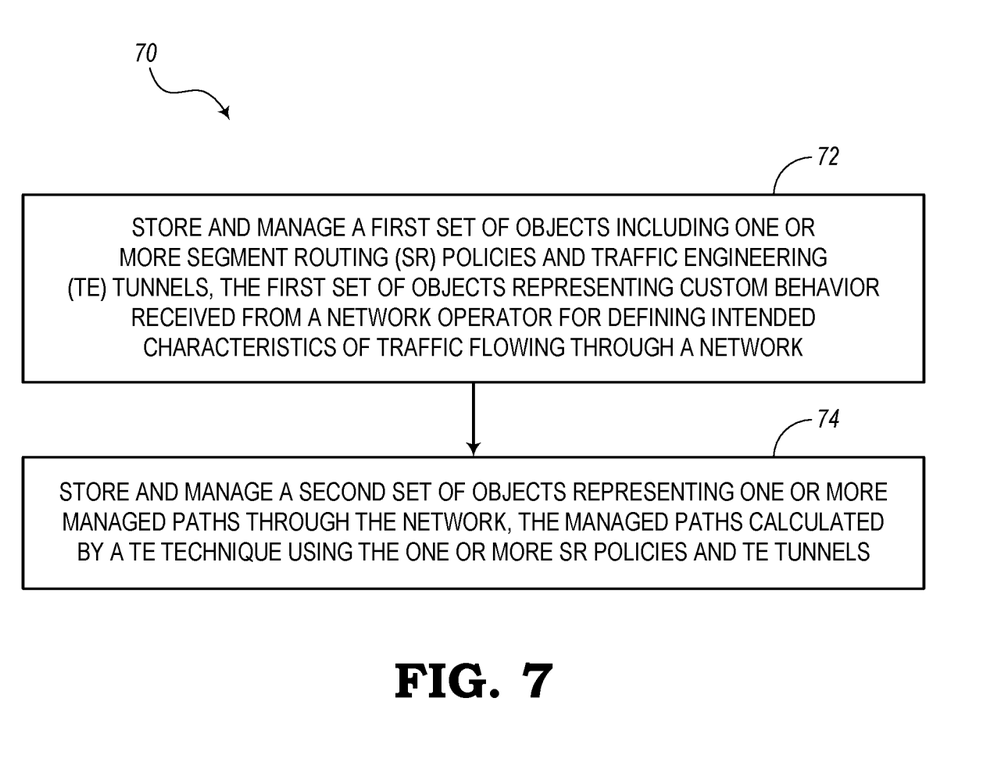
FIG. 7 is a flow diagram illustrating an embodiment of a process for computing paths through a network.

FIG. 7 is a flow diagram illustrating an embodiment of a process 70 for computing paths through a network. The process 70 may be performed by a PCE (e.g., PCE 20), such as a PCE using a traffic engineering algorithm (e.g., TE program 36). As illustrated, the process 70 includes the step of storing and managing a first set of objects (e.g., first set of managed objects 42) including one or more SR policies (e.g., managed SR policies 52) and TE tunnels (e.g., managed TE tunnels 54), as indicated in block 72. The first set of objects, for example, represents custom behavior received from a network operator for defining intended characteristics of traffic flowing through a network (e.g., network 10). The process 70 further includes the step of storing and managing a second set of objects (e.g., second set of managed objects 44) representing one or more managed paths (e.g., managed paths 60) through the network, as indicated in block 74. The managed paths, for example, are calculated by a TE technique using the one or more SR policies and TE tunnels.

According to some embodiments, the process 70 may further include the step of instantiating the one or more managed paths in the network to enable the traffic to flow from a source node (e.g., Node A) to a destination node (e.g., Node D) through one of the one or more managed paths. Of note, the PCE involves computing the paths for the network and having them stored in managed paths so that outside controllers can read them. Those skilled in the art will appreciate the actual provisioning of the paths on the devices may include these outside controllers, working with the PCE. Also, the process 70 may be configured to manage the first set of objects and the second set of objects separately. Also, the process 70 may include a) allowing the one or more managed paths to be added or removed from a Path Computation Engine (PCE), and b) automatically modifying the second set of objects using path calculation procedures and rule-based engines. The managed paths correspond to managed candidate paths inside of managed policies and managed LSPs inside of managed tunnels, so when managed candidate paths and managed LSPs are added/deleted due to modifications to those objects, then their corresponding managed paths are added or removed, and linked to or unlinked from their managed candidate paths or managed LSPs. And the managed paths may be further modified by path calculation or rule actions.

In some embodiments, the process 70 may include the steps of collecting bandwidth capacity of interfaces in the network and tracking bandwidth of the TE tunnels or SR policies based on the collected bandwidth capacity. The process 70 may determine protocols and events in the network and then calculate the managed paths based on the protocols and events. Also, the process 70 may be configured to track and monitor the one or more managed paths. The process 70 can also implement one or more customizable rules on any of the first and second sets of objects, where the one or more customizable rules may be based on the custom behavior received from the network operator.

Furthermore, in some embodiments, each of the TE tunnels or SR policies may include constraints, which may include a) link affinities, b) shared risk link groups, c) resource diversity from other TE paths, d) explicit inclusions or exclusions of specific nodes and interfaces, and/or e) bandwidth required. In some embodiments, a database (e.g., database 30) may be used for storing the first and second sets of objects. Also, the process 70 may include managing the first and second sets of objects via a database management system. The process 70 may include another step of converting the custom behavior into one or more customized rules. The SR policies described in block 72 may include a primary candidate path and one or more standby candidate paths. The TE tunnels described in block 72 may include a primary LSP and one or more standby LSPs. The TE tunnels may be set up and routed via RSVP or SR techniques.

According to various implementations, the programmable PCE may be configured in a number of ways. The PCE 20 may be configured such that 1) splitting managed paths from other managed objects can make it easy to consider intent operations and path operations separately. Also, the PCE 20 may be configured such that 2) internal implementations of simple add/update/remove operations for managed policies, managed tunnels, and managed paths can allow for larger actions to be broken down into simpler internal actions without unexpected side effects. The PCE 20 may also be configured such that 3) bandwidth tracking of TE paths allows a user to see how the managed object actions will affect network bandwidth and allows the user to verify actions or combination of actions to ensure they do not result in over-reservation of bandwidth. Furthermore, the PCE 20 may be configured such that 4) path-level, policy-level, tunnel-level, and group-level rule-based engines may allow the user to monitor changes to the PCE's managed objects and take necessary large-scale actions in a customizable manner, allowing for implementation of a wide range of behavior of different deployments without excessive customization being needed.

The embodiments of the present disclosure are configured to split the managed objects into managed policies and managed tunnels on the one hand and managed paths on the other. This allows the user to segregate intent fields to the former and path calculation results to the latter and allows for the structure of each to develop separately from each other. The present embodiments also make use of rule-based engines at different scopes. This allows for both broad and very fine-grained actions to be defined for different deployments, making it possible for different SP behaviors to be modeled through customizable rules in the same product.

The various solutions of the present disclosure allow for different SP demands or needs, which can then be broken down into specific rules and actions. Also, these rules and actions can be performed across a variety of scopes and can be defined in a user-friendly code-independent format (e.g., JSON) that removes the need to touch the code and minimizes the need for engineering or professional services to get involved. This may lower overall costs and may allow for the solutions to scale across an increasing number of customers and deployments.

One key feature is to define PCE demands for route optimization, route analysis, network management, network control, and network planning. The embodiments can allow route optimization and analysis functions to take a more active role in managing networks through control of SR policies and TE tunnels in the network. Also, the embodiments can make it easier for route optimization and analysis systems to use recently added Path Computation Element Protocol (PCEP) functionality in provisioning the network. It may also allow for network management and control systems to make better use of Layer 3 knowledge for optimized routes by giving Network Management Systems (NMSs) an easy to use interface through which to manage SR policies and TE tunnels.

Conclusion

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium storing computer logic having instructions that, when executed, enable a processing system in a Path Computation Element (PCE) to:
store and manage a first set of objects including one or more Segment Routing (SR) policies and Traffic Engineering (TE) tunnels, the first set of objects representing custom behavior received from a network operator for defining intended characteristics of traffic flowing through a network; and
store and manage a second set of objects representing one or more managed paths through the network, the one or more managed paths calculated by a TE technique using the one or more SR policies and TE tunnels,
wherein the first set of objects and the second set of objects are managed separately where monitoring and modifying of the intended characteristics is via Create/Read/Update/Delete (CRUD) operations on the first set of objects and modifying the one or more managed paths is performed exclusively through internal path calculation procedures and rule-based engines without CRUD operations on the second set of objects.

2. The non-transitory computer-readable medium of claim 1, wherein the instructions, when executed, further enable the processing system to instantiate the one or more managed paths in the network to enable the traffic to flow from a source node to a destination node through one of the one or more managed paths.

3. The non-transitory computer-readable medium of claim 1, wherein the instructions, when executed, further enable the processing system to group a plurality of managed paths of the one or more managed paths and associate the group with the first set of objects such that changes thereto apply to the plurality of managed paths in a single action.

4. The non-transitory computer-readable medium of claim 1, wherein the instructions, when executed, further enable the processing system to utilize bandwidth requests in the first set of objects to reserve bandwidth resources in the network.

5. The non-transitory computer-readable medium of claim 4, wherein the instructions, when executed, further enable the processing system to:
allow the one or more managed paths to be added or removed from the Path Computation Engine (PCE) when managed Candidate Paths (CPs) and Label Switched Paths (LSPs) are added or removed; and
automatically modify the one or more managed paths based on changes to corresponding objects of the first set of objects.

6. The non-transitory computer-readable medium of claim 1, wherein the instructions, when executed, further enable the processing system to:
collect bandwidth capacity of interfaces in the network; and
track bandwidth of the TE tunnels or the SR policies based on the collected bandwidth capacity.

7. The non-transitory computer-readable medium of claim 1, wherein the instructions, when executed, further enable the processing system to:
determine protocols and events in the network; and
calculate the one or more managed paths based on the determined protocols and events.

8. The non-transitory computer-readable medium of claim 1, wherein the instructions, when executed, further enable the processing system to track and monitor the one or more managed paths.

9. The non-transitory computer-readable medium of claim 1, wherein the instructions, when executed, further enable the processing system to implement one or more customizable rules on any of the first and second sets of objects, wherein the one or more customizable rules are based on custom behavior received from the network operator.

10. The non-transitory computer-readable medium of claim 1, wherein each of the TE tunnels or the SR policies includes constraints including one or more of link affinities, shared risk link groups, resource diversity from other TE paths, explicit inclusions or exclusions of specific nodes and links, and bandwidth reservation.

11. The non-transitory computer-readable medium of claim 1, wherein the processing system further comprising a database for storing the first and second sets of objects, wherein the instructions, when executed, further enable the processing system to manage the first and second sets of objects via a database management system.

12. The non-transitory computer-readable medium of claim 1, wherein the instructions, when executed, further enable the processing system to convert custom behavior into one or more customized rules.

13. The non-transitory computer-readable medium of claim 1, wherein the one or more SR policies include a primary candidate path and one or more standby candidate paths, and wherein the one or more TE tunnels include a primary Label-Switched Path (LSP) and one or more standby LSPs.

14. The non-transitory computer-readable medium of claim 13, wherein the one or more TE tunnels are set up and routed via RSVP or SR techniques.

15. A Path Computation Engine (PCE) comprising a processing system and memory configured for storing computer logic having instructions that, when executed, cause one or more processing devices to:
store and manage a first set of objects including one or more Segment Routing (SR) policies and Traffic Engineering (TE) tunnels, the first set of objects representing custom behavior received from a network operator for defining intended characteristics of traffic flowing through a network; and store and manage a second set of objects representing one or more managed paths through the network, the one or more managed paths calculated by a TE technique using the one or more SR policies and TE tunnels, wherein the first set of objects and the second set of objects are managed separately where monitoring and modifying of the intended characteristics is via Create/Read/Update/Delete (CRUD) operations on the first set of objects and modifying the one or more managed paths is performed exclusively through internal path calculation procedures and rule-based engines without CRUD operations on the second set of objects.

16. The PCE of claim 15, wherein the instructions, when executed, further cause the one or more processing devices to instantiate the one or more managed paths in the network to enable the traffic to flow from a source node to a destination node through one of the one or more managed paths.

17. The PCE of claim 15, wherein the instructions, when executed, further cause the one or more processing devices to group a plurality of managed paths of the one or more managed paths and associate the group with the first set of object such that changes thereto apply to the plurality of paths in a single action.

18. A method implemented in a Path Computation Element (PCE) comprising the steps of:

storing and managing a first set of objects including one or more Segment Routing (SR) policies and Traffic Engineering (TE) tunnels, the first set of objects representing custom behavior received from a network operator for defining intended characteristics of traffic flowing through a network; and storing and managing a second set of objects representing one or more managed paths through the network, the one or more managed paths calculated by a TE technique using the one or more SR policies and TE tunnels, wherein the first set of objects and the second set of objects are managed separately where monitoring and modifying of the intended characteristics is via Create/Read/Update/Delete (CRUD) operations on the first set of objects and modifying the one or more managed paths is performed exclusively through internal path calculation procedures and rule-based engines without CRUD operations on the second set of objects.

19. The method of claim 18, further comprising the steps of:

allowing the one or more managed paths to be added or removed from a Path Computation Engine (PCE) when managed Candidate Paths (CPs) and Label Switched Paths (LSPs) are added or removed; and automatically modifying the one or more managed paths based on changes to corresponding objects of the first set of objects.

20. The method of claim 18, further comprising the steps of:

collecting bandwidth capacity of interfaces in the network;

tracking bandwidth of the TE tunnels and SR policies based on the collected bandwidth capacity;

determining protocols and events in the network; and calculating the one or more managed paths based on the determined protocols and events.

* * * * *